March 17, 1964

M. D'AMORE 3,125,493

FUEL ELEMENT FOR A NUCLEAR REACTOR
AND METHOD OF MANUFACTURE

Filed Sept. 29, 1960

WITNESSES
Edwin E. Bassler
Edward F. Possessky

INVENTOR
Mead D'Amore
BY
ATTORNEY

United States Patent Office 3,125,493
Patented Mar. 17, 1964

3,125,493
FUEL ELEMENT FOR A NUCLEAR REACTOR AND METHOD OF MANUFACTURE
Mead D'Amore, Penn Hills, Pa., assignor to Westinghouse Electric Corporation, East Pittsburgh, Pa., a corporation of Pennsylvania
Filed Sept. 29, 1960, Ser. No. 59,421
6 Claims. (Cl. 176—76)

The present invention relates to nuclear reactors and more particularly to fuel elements employed therein and to methods for the fabrication of such elements.

Where a nuclear reactor includes a fuel arrangement having an array of fuel bearing elements, it is desirable that the fuel elements have a structural form which can be provided with economy yet which leads to desired physical objectives. For an example, if fuel pellets are to be housed in columnar relation within an elongated cladding member to form a fuel element, one physical objective is to enable the pellets to expand and contract in the longitudinal or columnar direction within the cladding member in response to temperature fluctuations of the pellets. Since the clearance between the outer lateral envelope of any one of the pellets and the inner lateral envelope of the cladding member is desirably minimized, for purposes including that of maximizing heat transfer through the cladding member, a probability exists that one or more of the pellets may jam against the cladding member rather than expand or move longitudinally in response to a temperature rise. Such a condition in the pertaining art is often referred to as "thermal ratcheting," and it can lead to damaging effects upon the fuel element because the portion of the column of pellets which is then restricted in longitudinal extension by the jammed pellet or pellets on cause, for example, deformation of the cladding material of the fuel element.

If, however, means are provided for supporting the pellets within the cladding member as a plurality of segments in tandem or columnar relation or as a segmented column, the probability of "thermal ratcheting" occurring is significantly diminished for at least two reasons. One is that, within each segment of the column, relatively few pellets are present so that the statistical probability of a jamming of one of the pellets included in a given one of the segments is materially reduced. In addition, if one of the pellets does jam and if the pellet supporting means are suitably arranged, at most the relatively few of the pellets in the effected segment are disabled from expanding freely so as not to lead to any damaging effect.

Thus, it is an object of the invention to provide a novel fuel element having means for supporting fuel pellets so as to avoid thermal jamming of the pellets.

It is another object of the invention to provide a novel fuel element of the character just described in which the supporting means are arranged so as also to accommodate heat transfer from the pellets.

An additional object of the invention is to provide a novel fuel element of the character described in the first object and in which the supporting means include a cladding member and a plurality of spaced discs to support the pellets and in which means are provided for positioning the discs relative to the cladding member so as to enable the fuel element to be handled freely prior to securance of the discs to the cladding member.

A further object of the invention is to provide a novel fuel element of the character described in the preceding object in which each of the discs has an opening to equalize fission gas pressure among various segments of the fuel element and also to avoid direct contact of the discs with hot spots of the adjacent pellets.

An additional object of the invention is to provide a novel fuel element having means for supporting fuel pellets so as to avoid thermal jamming of the pellets including a cladding member and a plurality of spaced discs and having means for positioning the discs relative to the cladding member prior to securance thereto including a groove in each disc into which the cladding member can be crimped or otherwise deformed.

It is a further object of the invention to provide a novel method for forming a fuel or other elongated element so as to include a tube in which individual fuel or other members are located in suitably spaced relation to allow for thermal expansion of the members.

These and other objects of the invention will become more apparent upon consideration of the following detailed description of the invention along with the attached drawings, in which.

Figure 1:
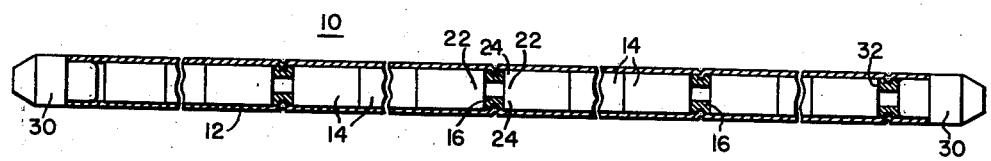
FIGURE 1 is a longitudinally sectioned view, with portions removed, of a fuel element fabricated in accordance with the principles of the invention.
Figure 2:
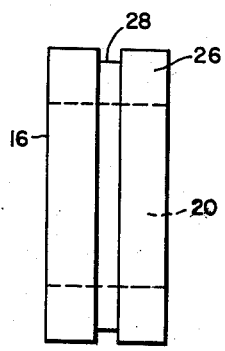
FIG. 2 is an enlarged elevational view of a disc or spacer which is used to divide the fuel element of FIG. 1 into segments or compartments.

With reference to FIG. 1, a fuel element 10 is provided for use along with other similar fuel elements in forming a fuel array or assembly in a nuclear reactor, for example in the manner disclosed in a copending application of E. Frisch, entitled "Fuel Element Assembly for a Neutronic Reactor," Serial No. 635,911, filed January 23, 1957, now abandoned, and assigned to the present assignee. Of course, the use of the fuel element 10 is not limited to the referenced fuel arrangement.

The fuel element 10 includes an elongated cladding member 12 which, in this case, is tubular in form and which can be comprised of any material having the desired structural, chemical and nuclear properties. An example of such a material is stainless steel or an alloy of zirconium. The dimensional parameters of the cladding member 12, of course, are determined by design considerations.

Inwardly of the cladding member 12 and along its length, a plurality of pellets 14 comprised of fuel bearing material are provided for cooperation with other pellets in other fuel elements in the aforementioned fuel assembly to form a chain nuclear reaction which yields extractable energy. In the aforementioned fuel assembly, means would be provided for controlling the reactivity rate. Uranium dioxide, slightly enriched with $U^{235}$ if desired, can, as an example, be employed as a material for the pellets 14.

Means for supporting the pellets 14 include, in addition to the cladding member 12, a plurality of spacers or discs 16. Each disc 16 is provided with an outer envelope which conforms substantially to the inner envelope of the cladding member 12 and which enables the disc 16 to be inserted into the cladding member 12. The discs 16 are spaced along the length of the cladding member 12 and a plurality of pellets 14 are included between each pair of adjacent discs 16. Thus, the pellets 14, being generally in tandem or columnar relation, are segmented into compartments through the use of the discs 16. Of course, the geometric form of the discs 16 can be other than that shown here so long as the necessary functions within the scope of the invention are provided by the discs 16.

Figure 3:
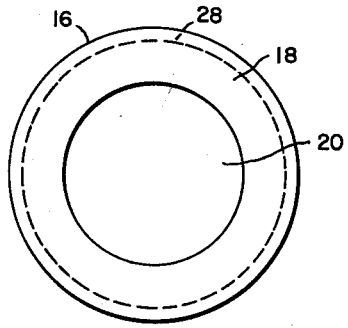
FIG. 3 is a top plan view of the disc of FIG. 2.

As viewed in FIG. 3, each disc 16 has a rim portion 18 inwardly of which is located an opening or hole 20 for purposes including that of equalizing the pressure of fission gases between the various compartments of the fuel element 10. In addition, with the presence of the hole 20, contact of any disc 16 with a central portion 22 of adjacent pellets 14 is avoided so as to exclude the possibility of the relatively high temperatures existing in the pellet portions 22 leading to damage or melting of the discs 16. The disc rim portion 18 does function as a path for the transfer of heat from other portions 24 of the pellets 14. For the purpose of enabling the discs 16 to be secured readily to the cladding member 12, a peripheral side 26 of each disc 16, or the entire outer surface of each disc 16 if desired, can be coated with a brazing alloy.

To provide means for positioning the discs 16 prior to their securance to the cladding member 12, a groove 28 is formed along the side 26 of each disc 16, into which the cladding member 12 can be crimped or otherwise deformed. As should now be impliedly clear, the discs 16 are so spaced as to provide clearance for the maximum expected expansion of those pellets 14 included in any one compartment formed between a pair of adjacent discs 16. It should also be evident that the number of discs 16 which are employed depends upon the overall length of the fuel element 10 and upon the degree to which one desires to avoid the aforementioned "thermal ratcheting" problem.

To complete the fuel element 10, an end plug 30 can be welded or otherwise secured to each end of the cladding member 12. In this manner, the pellets 14 can be sealed hermetically from the exterior of the cladding member 12 so as to avoid contamination of any coolant flowing along the fuel element 10. Corosive effects of the coolant are, of course, avoided through a proper selection of the material from which the cladding member 12 and the end plugs 30 are formed.

Figure 4:
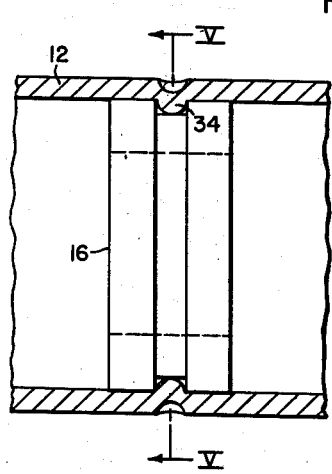
FIG. 4 is an enlarged partial, longitudinally, sectioned view of the fuel element of FIG. 1 showing the disc of FIG. 2 in assembled relation with a portion of the cladding member.
Figure 5:
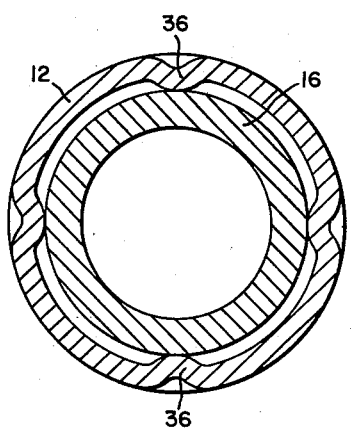
FIG. 5 is a cross-sectional view of the fuel element of FIGS. 1 and 4 taken along the reference line V—V of FIG. 4.

To assemble the fuel element 10, a suitable fixture can be employed for holding the cladding member 12 while an elongated rod bearing a disc 16 is inserted through the cladding member 12 so as to position the disc 16 adjacently of one end of the cladding member 12 as indicated by the reference character 32. Simultaneously, a deforming or crimping device, whose operating position is coordinated with the position of the inserted rod, can be employed to deform or crimp the cladding member 12 into the groove 28 of the inserted disc 16. Thus, as can be ascertained from FIG. 4, a deformed portion 34 of the cladding member 12 engages the inserted disc 16 so as to index or position the same relative to the axial direction of the cladding member 12. The deformed portion 34 may be provided peripherally about the cladding member 12, but it is preferred that the deformed portion 34 be limited in peripheral extent as indicated by the reference character 36 in FIG. 5.

Subsequent to the operation just considered, a plurality of pellets 14, determined in number as previously indicated, are inserted into the cladding member 12 in tandem relation with the inserted disc 16. Another disc 16 is then placed upon the inserting rod and delivered through the cladding member 12 to a position which provides the desired thermal clearance for the pellets 14 already inserted, and the crimping procedure previously set forth is again repeated. The procedure so far considered is then repeated until the cladding member 12 is fully loaded, and the end plugs 30 can then be secured to the cladding member 12 in the manner set forth previously in this description. The discs 16 can then be brazed to the cladding member 12, or, since the discs 16 are retained in position, the fuel element 10 can, without displacing the discs 16, be handled freely in forming the aforementioned fuel assembly so that any brazing operations incident to forming the assembly can be undertaken or accomplished simultaneously with the brazing of the discs 16 to the cladding member 12.

It is important to note that, for example in the instance where stainless steel is employed as a material for the cladding member 12, the stock from which the cladding member 12 is obtained can be hard tempered and need not be annealed for resiliency since no stretching of the cladding member 12 is required at any time in forming the fuel element 10. This being the case, an economy is obtained since a cladding member having a thinner wall than that of the cladding member of conventional fuel elements can be employed to yield an equivalent structural character.

Clearly, the "thermal ratcheting" problem is substantially avoided through the use of the invention since the probability of the occurrence of a jamming of one of the pellets 14 in any one compartment is relatively small within that compartment, and even if a jamming does occur the number of pellets 14 which are then restricted in thermal expansion are so few in number as not to lead to any damaging effects upon the fuel element 10. As already noted, these physical results are accompanied by desirable economic advantages. Of course, the significance of the "thermal ratcheting" problem increases with the total length of the fuel element 10 and, therefore, the value of the benefit obtained through the use of the invention similarly increases.

In the foregoing description, an arrangement of physical elements and method for fabricating the same have been set forth to point out the principles of the invention. Accordingly, the description has only been illustrative of the invention and it is desired that the invention be not limited by the exemplary details of the embodiment described herein, but, rather that it be accorded an interpretation of the scope and spirit of its broad principles.

Therefore, what is claimed is:

1. A fuel element for use in a nuclear fuel assembly, said fuel element comprising means for supporting a plurality of fuel bearing pellets including an elongated cladding member in which said pellets are positioned in longitudinal tandem relation, said supporting means including a plurality of spacing members dividing said pellets into longitudinal segments, and means for disposing said spacing members at respective positions enabling each of said segments to expand in the longitudinal direction relative to said cladding member, said disposing means including groove means extending inwardly into each of said spacing members into which the adjacent material of said cladding member is deformed to engage said spacing members against displacement.

2. A fuel element for use in a nuclear fuel assembly, said fuel element comprising means for supporting a plurality of fuel bearing pellets including an elongated cladding member in which said pellets are axially positioned in longitudinal tandem relation, said supporting means including a plurality of spacing members dividing said pellets into longitudinal segments, means for disposing said spacing members at respective positions enabling each of said segments to expand in the longitudinal direction relative to said cladding member, said disposing means including groove means extending inwardly into each of said spacing members into which the adjacent material of said cladding member is deformed to engage said spacing members against displacement, and means for enabling a central portion of each of said spacing members to be free from thermal conduction relative to the central portion of each adjacent pellet.

3. A fuel element for use in a nuclear fuel assembly, said fuel element comprising means for supporting a plurality of fuel bearing pellets including an elongated cladding member in which said pellets are positioned in longitudinal tandem relation, said supporting means including a plurality of spacing members dividing said pellets into longitudinal segments, and means for disposing said spacing members at respective positions enabling each of said segments to expand in the longitudinal direction relative to said cladding member, said disposing means including groove means extending inwardly into each of said spacing members into which the adjacent material of said cladding member is deformed to engage said spacing members against displacement, and each of said spacing members having a portion for forming a thermally conductive path with an outer portion of each adjacent pellet.

4. A fuel element for use in a nuclear fuel assembly, said fuel element comprising an elongated cladding member, a plurality of fuel bearing pellets being positioned in said cladding member in longitudinal tandem relation, and means for spacing said pellets in longitudinal segments with allowance for thermal expansion of said pellets, said spacing means including a plurality of discs being rigidly secured to said cladding member in spaced relation, and each of said discs having groove means into which peripherally spaced portions of said cladding member are crimped.

5. A method of positioning a plurality of members in an elongated tube in such a manner as to locate said members in longitudinal tandem relation and to provide space among said members to allow for longitudinal thermal expansion thereof, said method comprising longitudinally inserting a spacer within said tube and crimping at least one portion of said tube into groove means in said spacer, longitudinally inserting a given number of said members into said tube in tandem relation with said spacer, longitudinally inserting another spacer into said tube and crimping at least another portion of said tube into groove means in said other spacer so as to fix said other spacer in a position which provides space for longitudinal thermal expansion of the members already inserted, and repeating the method so far described until another given number of said members is positioned in said tube.

6. A method of positioning a plurality of fuel pellets in an elongated tube in such a manner as to locate said fuel pellets in longitudinal tandem relation and to provide space among said fuel pellets to allow for longitudinal thermal expansion thereof, said method comprising longitudinally inserting a spacer within said tube and crimping at least one portion of said tube into groove means in said spacer, longitudinally inserting a given number of said fuel pellets into said tube in tandem relation with said spacer, longitudinally inserting another spacer into said tube and crimping at least another portion of said tube into groove means in said other spacer so as to fix said other spacer in a position which provides space for longitudinal thermal expansion of the fuel pellets already inserted, repeating the method so far described until another given number of said fuel pellets is positioned in said tube, inserting a sealing plug into each end of said tube, and permanently securing said tube to each of said plugs and each of said spacers.

References Cited in the file of this patent
UNITED STATES PATENTS

| | | |
|---|---|---|
| 2,838,452 | West et al. | June 10, 1958 |
| 2,874,459 | Haldemon | Feb. 24, 1959 |
| 2,879,216 | Hurwitz et al. | Mar. 24, 1959 |
| 2,886,503 | Szilard | May 12, 1959 |